United States Patent Office.

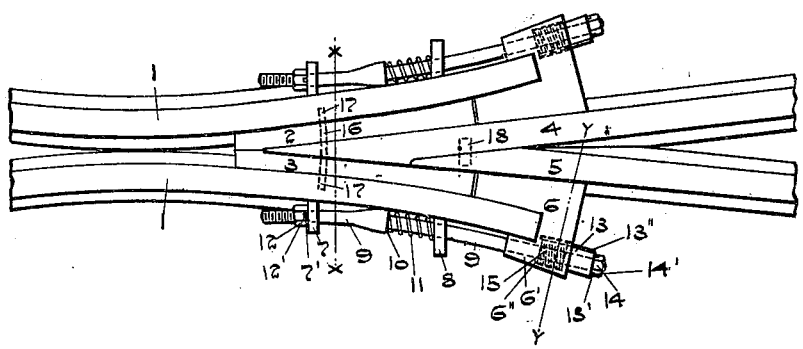

GEORGE B. DONNELLY, OF CHICAGO, ILLINOIS.

RAILWAY-FROG.

SPECIFICATION forming part of Letters Patent No. 631,420, dated August 22, 1899.

Application filed April 28, 1899. Serial No. 714,841. (No model.)

*To all whom it may concern:*

Be it known that I, GEORGE B. DONNELLY, a citizen of the United States of America, and a resident of Chicago, in the county of Cook and State of Illinois, have invented certain new and useful Improvements in Railway-Frogs, of which the following is a specification.

My invention relates to railway-frogs, and particularly to the clamping mechanism for retaining the wing-rails or guard-rails in proper position.

The main objects of my invention are to provide improved clamping mechanism which can be readily attached and which will readily readjust itself after a strain, to provide for using a number of clamps along the sides of the wing-rails, which clamps are relatively adjusted by springs, and to provide a novel combined clamp and foot-guard at the free end of the wing-rails or guard-rails. I accomplish these objects by the mechanism illustrated in the accompanying drawings, in which—

Figure 1 is a top plan of a frog and clamping mechanism constructed according to my invention. Fig. 2 is a vertical section on the line $x\,x$ of Fig. 1, and Fig. 3 is a vertical section on the line $y\,y$ of Fig. 1.

The frog-point shown is formed of the main rails 4 and 5, riveted together through the webs of the rails at 18. The fillers 2 and 3 intervene between the main rails 4 and 5 and the wing-rails 1. The clamps 7 and 8 slidingly engage the base-flanges of the wing-rails 2 and 3. The clamps 7 and 8 are perforated near their ends for receiving the rods 9. The rods 9 each have thereon a shoulder 10 and a spring intervening between said shoulder and the clamp 8. A combined foot-guard and a clamp 6 engages the end of each wing-rail and has its outer arm 6' perforated to receive the rod 9. A spring 15 intervenes between the shoulder 6'' and the sleeve 13, which surrounds the rod 9 and passes into the perforation in the arm 6'. The sleeve 13 has a feather 13'' passing into a groove in the interior of the arm 6' and has a pin 13' fitting into the recess 14' in the nut 14, which is threaded on the rod 9. At the other end of the rod 9 is a nut 12, which has a recess 12' for receiving the pin 7' on the clamp 7. A pin 16 passes through a perforation in the rails 4 and 5 near the frog-point, through the guards 2 and 3, and into the sockets 17 in the rails 1.

In adjusting the device in proper position the clamp 8 is first forced along the rails 1 as near as possible to their free ends. The clamp 7 is then pushed up as near as possible to the clamp 8, but being of less width will remain a considerable distance from the clamp 8, due to the spread of the rails. The nut 12 is then adjusted on the rod 7 and the pin 7' locked into the recess 12'. The rod 9 is then pushed forward as far as possible toward the free ends of the wing-rails and through the arm 6'. The sleeve 13 is then forced into the arm 6' against the spring 15 and the nut 14 screwed inwardly against the sleeve 13. When the sleeve is released by the operator, the spring 15 will force same toward the nut 14, and when the nut is turned so that the pin 13' registers with the recess 14' the nut is thereby and through operation of the spring 15 locked into proper position on the rod 9.

It will be seen that the clamp 7 is drawn up tightly on the rails 1 by the rod 9 and nuts at its ends. The spring 15 serves to keep same constantly far enough forward to be tight against the base-flanges of said rails. The spring 11, seated against the shoulder 10 on the rod 9, acting against the clamp 8, operates to likewise keep the clamp 8 forward and tight against the base-flanges of the rails 1.

It is plain that the form of the parts and details of construction of my device may be altered in various ways without departing from the spirit of my invention. I therefore do not confine myself to such details except as hereinafter limited in the claims.

I am aware that it is old to secure a clamp corresponding to the clamp 7 by rods hooked around the ends of the wing-rails. I therefore do not claim such construction broadly.

What I claim as my invention, and desire to secure by Letters Patent, is—

1. The combination of a railway-frog, with the diverging wing-rails; a clamp connecting said wing-rails and movable longitudinally of same; the foot-guards intervening the frog and wing-rails and each having an integral extension around the free ends of the adjoining wing-rail; and adjustable rods connecting said extension with the clamp.

2. The combination of a railway-frog, with the diverging wing-rails; a clamp connecting said wing-rails and movable longitudinally of same; the foot-guards intervening the frog and wing-rails and each having an integral extension around the free ends of the adjoining wing-rails, with a perforation through such extension longitudinal of the rail; a spring seated in said perforation; a sleeve feathered therein and abutting the spring; a rod secured to said clamp and extending through said perforation and sleeve; and a nut threaded to the free end of said rod and adapted to interlock with said sleeve.

3. The combination of a railway-frog, with the diverging wing-rails; a rear clamp, and a forward clamp of greater width, each connecting said wing-rails and movable longitudinally of same; adjustable rods connecting said rear clamp with the free ends of the wing-rails; and a spring, seated between said clamps and operating to separate same.

4. The combination of a railway-frog, with the diverging wing-rails; a rear clamp, and a forward clamp of greater width, each connecting said wing-rails, and movable longitudinally of same; a clamp-jaw engaging the free end of each wing-rail; rods having a nut threaded upon each end for adjustably connecting said rear clamp with said clamp-jaw, and each having a shoulder thereon between said rear and forward clamps; and a spring seated on each of said shoulders and operating against the forward clamp.

5. The combination of a main rail, a wing or guard rail, a foot-guard intervening between said rails and having an extension around the free end of said wing or guard rail, a clamp engaging said rails and movable longitudinally of same, a rod connecting said clamp and said extension, and a spring acting between said rod and extension whereby the clamp is normally urged toward said extension.

6. The combination of a pair of diverging rails, a clamp connecting same and movable longitudinally of same, and a spring acting on said clamp normally urging same toward the diverging ends of said rails.

Signed by me at Chicago, Illinois, this 26th day of April, 1899.

GEORGE B. DONNELLY.

Witnesses:
WM. R. RUMMLER,
J. A. FREUND.